(12) United States Patent
Oraby et al.

(10) Patent No.: US 8,440,960 B2
(45) Date of Patent: May 14, 2013

(54) SALT CONCENTRATION LOGGING SYSTEMS AND METHODS

(75) Inventors: Moustafa E. Oraby, Cairo (EG); Jerome A. Truax, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/741,076

(22) PCT Filed: Sep. 30, 2008

(86) PCT No.: PCT/US2008/078267
§ 371 (c)(1),
(2), (4) Date: May 3, 2010

(87) PCT Pub. No.: WO2010/039122
PCT Pub. Date: Apr. 8, 2010

(65) Prior Publication Data
US 2011/0204217 A1    Aug. 25, 2011

(51) Int. Cl.
*G01V 5/10* (2006.01)
(52) U.S. Cl.
USPC ........................................ 250/269.6
(58) Field of Classification Search .......... 250/269.6
See application file for complete search history.

(56) References Cited

U.S. PATENT DOCUMENTS

| | | |
|---|---|---|
| RE24,383 E | 10/1957 | McKay |
| 3,244,882 A | 4/1966 | Baldwin et al. |
| 3,413,471 A | 11/1968 | Tittman |
| 3,772,513 A | 11/1973 | Hall et al. |
| 3,930,154 A | 12/1975 | Scott |
| 3,979,300 A | 9/1976 | Paap et al. |
| 4,191,884 A | 3/1980 | Scott |
| 4,209,695 A | 6/1980 | Arnold et al. |
| 4,379,228 A | 4/1983 | Allen |

(Continued)

FOREIGN PATENT DOCUMENTS

| | | |
|---|---|---|
| WO | WO03/023454 | 3/2003 |
| WO | WO-2010/039121 | 4/2010 |
| WO | WO-2010/039122 | 4/2010 |
| WO | WO-2012/039707 | 3/2012 |

OTHER PUBLICATIONS

"Formation Evaluation Neutron Porosity", Wikipedia, http://en.wikipedia.org/wiki/Formation evaluation neutron porosity, Oct. 16, 2008, 2 pgs.

(Continued)

*Primary Examiner* — David Porta
*Assistant Examiner* — Hugh H Maupin
(74) *Attorney, Agent, or Firm* — Krueger Iselin LLP; Benjamin Fite

(57) ABSTRACT

Water salinity and water saturation measurements are enhanced by systems and methods for logging salt concentration in formation fluids. Some tool embodiments augment a neutron porosity logging tool with a gamma ray detector configured to measure the rate at which hydrogen nuclei capture neutrons from a neutron source. The ratio of the hydrogen-capture gamma ray count rate to the neutron flux can be combined with a porosity measurement to derive the salt concentration in the formation fluids. When the salt concentration is further combined with resistivity measurements, the water salinity and water saturation can be derived. Some tool embodiments employ a continuous neutron source, Helium-3 filled neutron detectors, and a gamma ray detector that is the same distance from the source as one of the neutron detectors.

20 Claims, 4 Drawing Sheets

U.S. PATENT DOCUMENTS

| | | | |
|---|---|---|---|
| 4,404,467 A | 9/1983 | Schweitzer et al. | |
| 4,424,444 A | 1/1984 | Smith et al. | |
| 4,918,669 A | 4/1990 | Chemali et al. | |
| 5,081,351 A | 1/1992 | Roscoe | |
| 5,097,123 A | 3/1992 | Grau et al. | |
| 5,668,369 A | 9/1997 | Oraby | |
| 5,900,627 A | 5/1999 | Odom et al. | |
| 6,564,883 B2 | 5/2003 | Fredericks et al. | |
| 6,600,321 B2 | 7/2003 | Evans | |
| 6,678,616 B1 | 1/2004 | Winkler et al. | |
| 6,868,036 B2 | 3/2005 | Wang et al. | |
| 6,909,666 B2 | 6/2005 | Dubinsky et al. | |
| 6,957,700 B2 | 10/2005 | Mandal | |
| 7,098,664 B2 | 8/2006 | Bittar et al. | |
| 7,099,810 B2 | 8/2006 | Mandal | |
| 7,272,504 B2 | 9/2007 | Akimov et al. | |
| 2002/0014583 A1* | 2/2002 | Bothner | 250/269.7 |
| 2004/0222368 A1 | 11/2004 | Odom et al. | |
| 2005/0006090 A1 | 1/2005 | Chemali et al. | |
| 2005/0078555 A1 | 4/2005 | Tang et al. | |
| 2006/0198242 A1 | 9/2006 | Geerits et al. | |
| 2008/0179510 A1 | 7/2008 | Jacobi | |
| 2010/0020638 A1 | 1/2010 | Mickael et al. | |
| 2010/0262371 A1 | 10/2010 | Oraby | |

OTHER PUBLICATIONS

PCT International Search Report and Written Opinion, dated Dec. 8, 2008, Appl No. PCT/US08/78267, "Salt Concentration Logging Systems and Methods", filed Sep. 30, 2008, 7 pgs.

PCT International Search Report and Written Opinion, dated Dec. 12, 2008, Appl No. PCT/US08/78261, "Systems and Methods for Evaluating Formations Having Unknown or Mixed Salinity", filed Sep. 30, 2008, 8 pgs.

* cited by examiner

SALT CONCENTRATION LOGGING SYSTEMS AND METHODS

BACKGROUND

Generally speaking, drillers and well completion engineers can exploit hydrocarbon reservoirs more effectively when they are better informed about the conditions in and around the well bore. Such information typically includes characteristics of the earth formations traversed by the borehole, along with data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole. The direct electrical connection between the surface and the sonde provides a relatively large bandwidth for conveying logging information.

In LWD, the drilling assembly includes sensing instruments that measure various parameters as the formation is being penetrated. While LWD techniques allow more contemporaneous, and often more accurate, formation measurements, it is difficult to establish and maintain a direct electrical connection in an LWD environment. Consequently, the logging data is often stored in internal memory until the sensing instruments are retrieved to the surface where the logging data can be downloaded. Alternatively, LWD communication channels such as mud pulse signaling, through-wall acoustic signaling, and/or low frequency electromagnetic wave signaling can be employed to communicate the logging data to the surface.

A wide variety of wireline and LWD sensing instruments are available. However, the traditional "triple-combo" log is adequate for most wells, and in any event, it is run in nearly every well even when other logs are collected. The traditional "triple-combo" log includes four logs: a natural gamma ray log, a resistivity log, a density log, and a neutron porosity log.

The natural gamma ray log measures the natural radioactivity of the formation surrounding the borehole. This radioactivity provides an indication of the presence of certain minerals in the formation and it can be helpful in distinguishing reservoir formations from surrounding beds.

The resistivity log measures the resistivity of the formation surrounding the borehole. In porous formations, this resistivity is dominated by the conductivity of the fluids in the pore space. Accordingly, this log is helpful in distinguishing hydrocarbons from groundwater.

The density log measures the scattering of gamma rays emitted into the formation from the borehole. The intensity of scattered gamma rays is indicative of the density of electrons in the formation, which in turn is indicative of the density of the rock in the formation.

The neutron porosity log measures the energy loss rate or capture rate of neutrons emitted into the formation from the borehole. These rates are dominated by the concentration of hydrogen atoms in the formation. Because the presence of this hydrogen is primarily due to the water or hydrocarbon fluids in the pore space of the rock, the measured rates provide an indication of the porosity of the formation rock.

Ground water salinity is an important parameter that affects not only the accuracy of the neutron porosity measurement, but also affects the resistivity-log-based determination of water and hydrocarbon saturation. The neutron porosity measurement is adversely affected because the chlorine strongly absorbs neutrons, whereas the water saturation determination is adversely affected because the salinity determines the ground water's conductivity.

The standard techniques for determining ground water salinity are: (1) take a water sample from the well after it has been drilled, or (2) extrapolate from other wells in the region. Experience has shown this approach to be unreliable due to significant salinity variation within and between wells, particularly when fluid injection is employed for secondary recovery. In the latter case, the fluid injection causes substantial salinity variation laterally across the reservoir and vertically around the reservoir, making the standard techniques impractical or hopelessly inaccurate.

BRIEF DESCRIPTION OF THE DRAWINGS

A better understanding of the various disclosed embodiments can be obtained when the following detailed description is considered in conjunction with the following drawings, in which.

DETAILED DESCRIPTION

The issues identified in the background are at least partly addressed by the disclosed salt concentration logging systems and methods that enable accurate reservoir evaluation in the presence of unknown- or mixed-salinity ground water. Some tool embodiments augment a neutron porosity logging tool with a gamma ray detector configured to measure the rate at which hydrogen nuclei capture neutrons from a neutron source. The ratio of the hydrogen-capture gamma ray count rate to the neutron flux can be combined with a porosity measurement to derive the salt concentration in the formation fluids. When the salt concentration is further combined with resistivity measurements, the water salinity and water saturation can be derived. These quantities (i.e., the ratio, the salt concentration, the water salinity, and the water saturation) can each be displayed as a function of depth or position in the borehole. Some tool embodiments employ a continuous neutron source, Helium-3 filled neutron detectors, and a gamma ray detector that is the same distance from the source as one of the neutron detectors.

Figure 1:
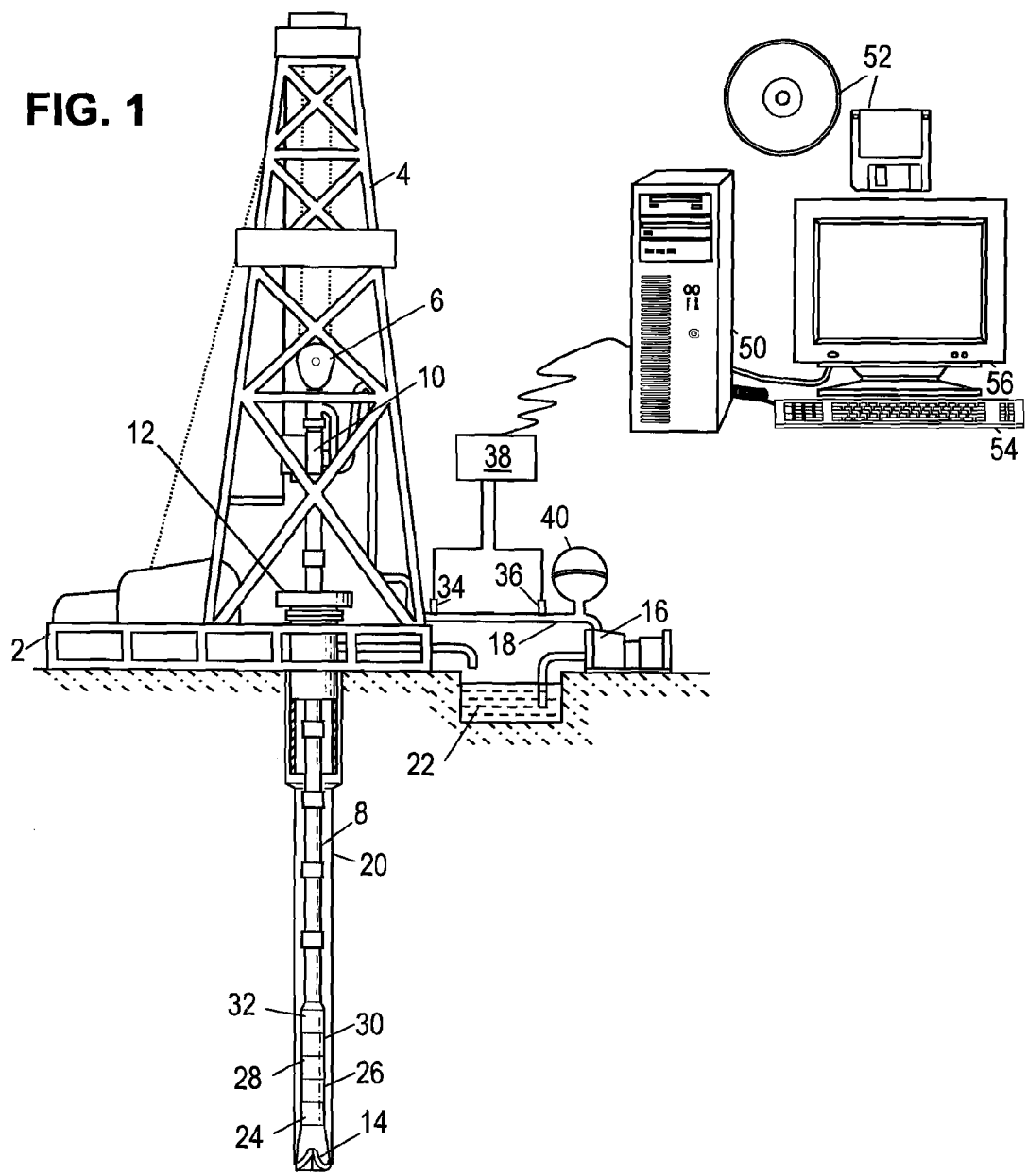
FIG. 1 shows an illustrative logging-while-drilling environment with a "triple-combo" sensing assembly.

The disclosed embodiments are best understood in the context of their environment. Accordingly, FIG. 1 shows an illustrative logging while drilling (LWD) environment. A drilling platform 2 is equipped with a derrick 4 that supports a hoist 6. Drilling of oil and gas wells is carried out by a string of drill pipes 8. The hoist 6 suspends a top drive 10 that is used to rotate the drill string 8 and to lower the drill string through the wellhead 12. Connected to the lower end of the drill string 8 is a drill bit 14. The bit 14 is rotated and drilling accomplished by rotating the drill string 8, by use of a downhole motor near the drill bit, or by both methods. Mud recirculation equipment 16 pumps drilling fluid through supply pipe 18, through top drive 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 22 on the surface. On the surface, the drilling mud is cleaned and then recirculated by recirculation equipment 16. The drilling mud cools the drill bit 14, carries cuttings from the base of the bore to the surface, and balances the hydrostatic pressure in the rock formations.

The bottomhole assembly (i.e., the lowermost part of drill string 8) includes thick-walled tubulars called drill collars to add weight and rigidity to aid the drilling process. The thick walls of these drill collars make them useful for housing instrumentation and LWD sensors. Thus, for example, the bottomhole assembly of FIG. 1 includes a natural gamma ray detector 24, a resistivity tool 26, a density tool 28, a porosity tool 30, and a control & telemetry module 32. Other tools and sensors can also be included in the bottomhole assembly, including position sensors, orientation sensors, pressure sensors, temperature sensors, vibration sensors, etc. From the various bottomhole assembly sensors, the control and telemetry module 32 collects data regarding the formation properties and/or various drilling parameters, and stores the data in internal memory. In addition, some or all of the data is transmitted to the surface by, e.g., mud pulse telemetry.

Telemetry module 32 modulates a resistance to drilling fluid flow to generate pressure pulses that propagate to the surface. One or more pressure transducers 34, 36 (isolated from the noise of the mud pump 16 by a desurger 40) convert the pressure signal into electrical signal(s) for a signal digitizer 38. The digitizer 38 supplies a digital form of the pressure signals to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to obtain and view a salt concentration log and/or a triple-combo log.

Figures 2A, 2B, 2C:
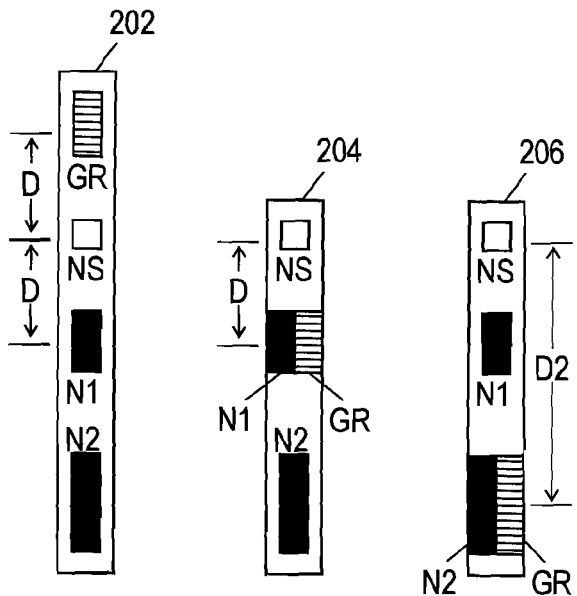
FIGS. 2A-2C are diagrams of illustrative embodiments of a neutron-porosity and salt concentration logging tool.

FIG. 2A shows a first illustrative embodiment of a neutron porosity tool 202 that can provide a salt concentration log. Tool 202 includes a continuous neutron source NS such as Americium-Beryllium (Am—Be) chemical source. Other neutron sources such as a pulsed neutron source could also be used. Tool 202 also includes two neutron detectors N1 and N2, sometimes respectively termed the "near" and "far" neutron detectors. The neutron detectors can be designed to count thermal (around about 0.025 eV) or epithermal (between about 0.1 eV and 100 eV) neutrons. Suitable neutron detectors include Helium-3 (He-3) filled proportional counters, though of course other neutron counters can also be used. To improve tool performance, each detector can be implemented as a bank of individual detection devices. In accordance with standard neutron porosity tool measurement techniques, the ratio of far-to-near neutron detector counts is indicative of the formation porosity. See, e.g., U.S. Pat. No. 4,570,067 (Larry Gadeken); U.S. Pat. No. 4,625,110 (Harry D. Smith, Jr.); and U.S. Pat. No. 4,631,405 (Harry D. Smith, Jr.).

A distinguishing feature of tool 202 relative to prior art is the addition of a gamma ray detector GR. The gamma ray detector can be a scintillation crystal coupled to a photomultiplier tube. As with the neutron detector, the gamma ray detector can be implemented as a bank of individual detection devices whose results are aggregated.

In FIG. 2A, the gamma ray detector is "co-distant" with the near neutron detector N1, i.e., it is positioned at the same distance D from the source NS as the near neutron detector N1. In the embodiment of FIG. 2A, the gamma ray detector GR and the neutron detector N1 are located in opposite directions from neutron source NS. FIG. 2B shows an alternative embodiment in which a neutron porosity tool 204 has a gamma ray detector GR and a near neutron detector N1 co-located, i.e., located side-by-side at the same distance D from the neutron source NS. FIG. 2C shows yet another alternative embodiment in which a neutron porosity tool 206 has a gamma ray detector GR and a far neutron detector N2 co-located at a distance D2 from the neutron source NS.

The multiple neutron detectors N1, N2 of tools 202, 204, and 206, enable the tools to measure formation porosity using any of the existing multiple-spacing techniques. In addition, the presence of a gamma ray detector GR having a common distance from the source with one of the neutron detectors, enables the measurement of formation salt concentration as will be discussed further below.

Figure 3:
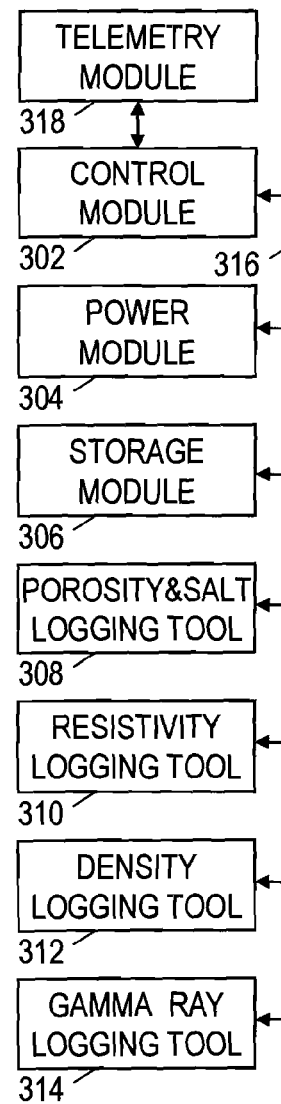
FIG. 3 is a block diagram of an illustrative bottom-hole assembly.

FIG. 3 is a block diagram of an illustrative downhole tool system having a control module 302, a power module 304, an optional storage module 306, and triple-combo logging tools 308-314, i.e., a porosity & salt concentration logging tool 308, a resistivity logging tool 310, a density logging tool 312, and a gamma ray logging tool 314. A tool bus 316 enables the control module 302 to communicate with each of the other modules 304-314 to transfer data and control their operations. Control module 302 incorporates or couples to a telemetry module 318 to enable the control module to communicate with a data processing system 50 (FIG. 1) at the surface. The control module 302 exchanges data with data processing system 50 and receives commands for configuring the operation of the bottom hole tool assembly.

Power module 304 supplies power to the other modules. To that end, the power module 304 may include an energy storage device such as a bank of batteries, and/or an electrical power generator such as a turbine in the mud flow or a vibrational energy harvester. Optional storage module 306 includes memory for storing logging measurement data until it can be transmitted to the surface or until the tool is recovered and the data can be directly downloaded. Sensor modules 308-314 represent triple-combo logging tools for measuring formation characteristics. Other tools and sensors can also be included to measure other formation characteristics or parameters of the drilling operation including tool position and orientation.

Control module 302 configures the operation of the sensor modules and coordinates the transfer of tool measurement data from the sensor modules to the storage module. In addition, control module 302 sends some or all of the data to the surface for viewing and analysis during the logging process. Telemetry module 318 communicates data to the surface using any suitable LWD telemetry technique including mud pulse telemetry, acoustic telemetry, and electromagnetic telemetry.

Figure 4:
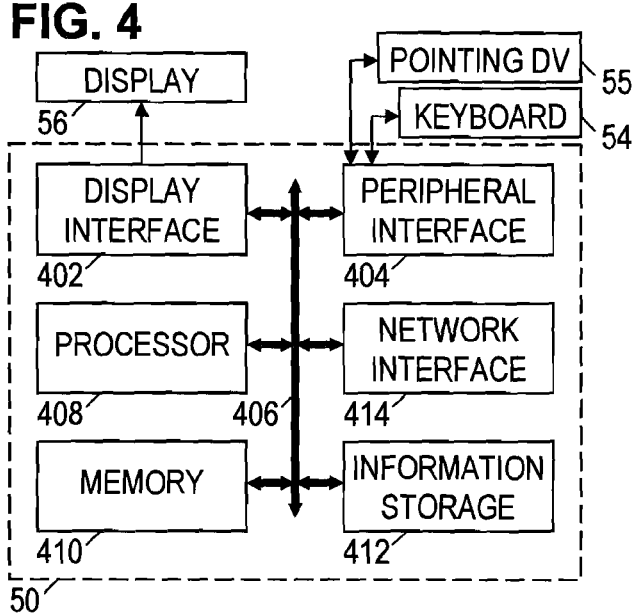
FIG. 4 is a block diagram of an illustrative logging data processing system.

FIG. 4 is a block diagram of an illustrative surface processing system suitable for collecting, processing, and displaying logging data. In some embodiments, a user may further interact with the system to send command to the bottom hole assembly to adjust its operation in response to the received data. The system of FIG. 4 can take the form of a desktop computer that includes a chassis 50, a display 56, and one or more input devices 54, 55. Located in the chassis 50 is a display interface 402, a peripheral interface 404, a bus 406, a processor 408, a memory 410, an information storage device 412, and a network interface 414. Bus 406 interconnects the various elements of the computer and transports their communications.

In at least some embodiments, the surface telemetry transducers 34-36 are coupled to the processing system via the network interface 414 to enable the system to communicate with the bottom hole assembly. In accordance with user input received via peripheral interface 404 and program instructions from memory 410 and/or information storage device 412, the processor processes the received telemetry information received via network interface 414 to construct formation property logs and display them to the user.

The processor 408, and hence the system as a whole, generally operates in accordance with one or more programs stored on an information storage medium (e.g., in information storage device 412). Similarly, the bottom hole assembly control module 302 operates in accordance with one or more programs stored in an internal memory. One or more of these programs configures the control module and processing system to carry out at least one of the salt concentration logging (or salt-compensated logging) methods disclosed herein.

Figure 5:
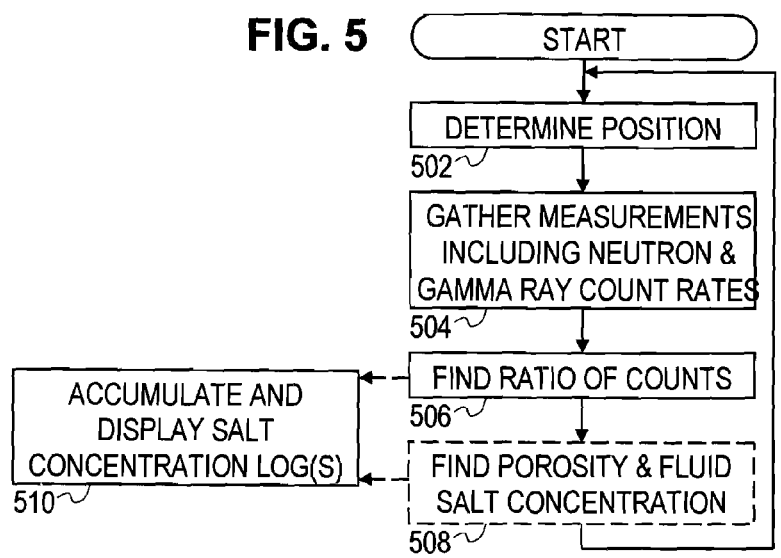
FIG. 5 is a flow diagram of an illustrative salt concentration logging method.

FIG. 5 is a flowchart of an illustrative salt concentration logging method that can be carried out by the data processing system 50, the control module 302, the porosity & salt concentration logging tool 308, or some combination thereof. Though the measurement data originates in the tool 308 and the logs are displayed by system 50, control of the various operations described below can be concentrated in any of the foregoing components or shared between them. In the embodiment described below, control of the salt concentration logging process resides with the control module 302.

In block 502, control module 302 determines the current position of the bottomhole assembly. The current position can be determined in a number of ways, but the two most common ways are (1) by reference to an inertial tracker incorporated in the bottomhole assembly; and (2) by taking a timestamp from an internal clock. If the clock has been carefully synchronized with a separate position tracking system on the surface, the bottomhole assembly's position can be later reconstructed from the current timestamp.

In block 504, the control module gathers logging data from the various sensors, including neutron detector count rates and gamma ray count rates from the porosity & salt concentration logging tool. In certain contemplated tool embodiments, the He-3 neutron detectors count thermal and epithermal neutrons to determine a neutron count rate. It is possible, though not necessary, to configure the neutron detectors to measure the energy of each detected neutron. A filtering process can then be applied to screen out unwanted counts. Moreover, when a pulsed neutron source is employed, time windows measured relative to the neutron pulse times can be used to monitor the time evolution of the neutron count rates and their associated energies. In the ensuing discussion, it is assumed that a continuous neutron source is used and the neutron count rates represent all detected thermal and epithermal neutrons per unit time. The time unit can be varied as desired to trade off between response time and statistical variation, but a 100 millisecond time unit may be satisfactory for most systems.

The gamma ray detector can similarly be configured to measure gamma ray energies and count rates within certain time windows if desired. In the ensuing discussion, it is assumed that the gamma ray detector measures count rates only for hydrogen capture gamma rays, i.e., gamma rays having approximately 2.23 MeV of energy. Gamma rays having other energies are detected but are excluded from the count based on their measured energies. As before, the time unit for measuring count rates can be varied as desired to trade off between response time and statistical variation, but a 100 millisecond time unit may be satisfactory for most systems.

In block 506, the control module calculates the ratio of gamma ray detector count rate G to neutron detector count rate N for the co-distant detectors. The G/N ratio provides a measure of neutron absorption by Chlorine nuclei that is compensated for borehole effects and variation of source intensity. This ratio can itself serve as a measure of salt concentration in the formation.

Figure 6:
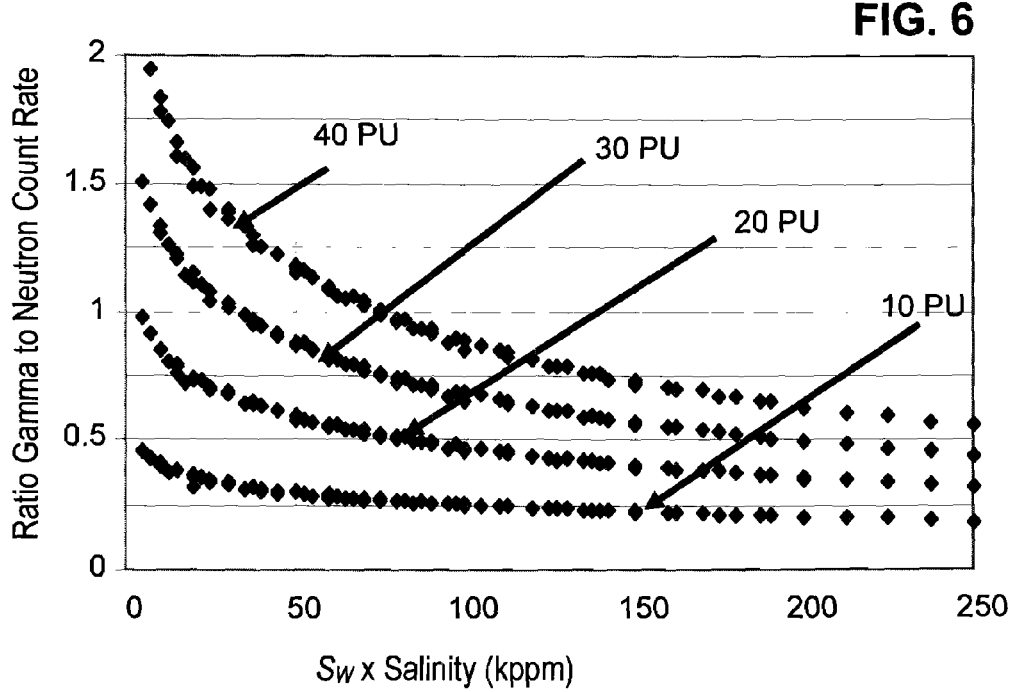
FIG. 6 is a graph illustrating a gamma-to-neutron count ratio as a function of porosity and salt concentration of the formation fluid.

We note here that any salt that is present in the formation is normally dissolved in water, making the ratio G/N expressible in terms of porosity $\phi$, water saturation $S_W$, and water salinity S. FIG. 6 shows the results of Monte Carlo model simulations, which demonstrate how the ratio varies as a function of porosity $\phi$ and the product of water saturation $S_W$ with water salinity S. A reasonably good curve fit is achieved by the equation:

$$G/N = A(\phi)\ln(S_W \cdot S) + B(\phi), \quad (1)$$

where G is the gamma ray count rate, N is the neutron count rate for the co-distant neutron detector, and $A(\phi)$ and $B(\phi)$ are linear functions of porosity $\phi$. The coefficient functions $A(\phi)$ and $B(\phi)$ can be determined during the calibration of the tool.

Returning to FIG. 5, the control module combines the neutron detector count rates to determine a neutron-based measurement of formation porosity $\phi_N$ in optional block 508. In bottomhole assemblies with density logging tools, a density-based porosity $\phi_D$ can also be calculated:

$$\phi_D = \frac{\rho - \rho_m}{1 - \rho_m}, \quad (2)$$

where $\rho$ is the density measured by the density tool, and $\rho_m$ is the matrix density (usually assumed to be 2.66 g/cm$^3$, the density of quartz). The neutron-based porosity and density-based porosity can be averaged for a more accurate porosity estimate.

With the estimated porosity in block 508, the control module can apply equation (1) to determine the salt concentration of the formation fluid, i.e., the product of water saturation $S_W$, and water salinity S. In block 510, the control module supplies the G/N ratio and optionally the formation fluid salt concentration to the data processing system at the surface for that system to compile the salt concentration log(s) and display them to a user.

Figure 7:
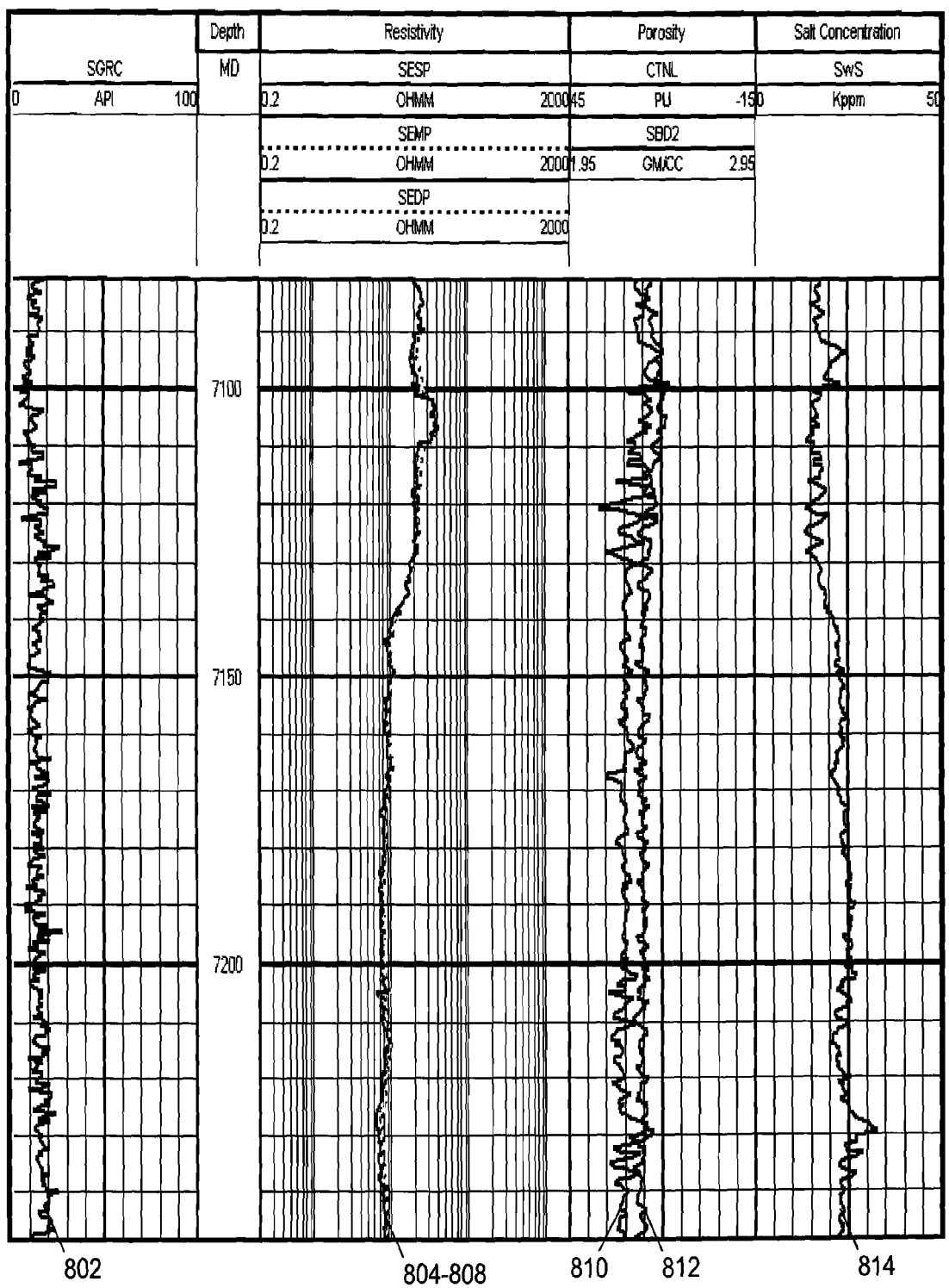
FIG. 7 is an illustrative "triple-combo" log augmented with a salt-concentration log. While the disclosed systems and methods are susceptible to various modifications and alternative forms, specific embodiments thereof are shown by way of example in the drawings and will herein be described in detail. It should be understood, however, that the drawings and detailed description thereto are not intended to limit the claims to the particular disclosed embodiments, but on the contrary, the intention is to cover all modifications, equivalents and alternatives falling within the spirit and scope of the present invention as defined by the appended claims.

As shown by the illustrative logs in FIG. 7, the display can include a natural gamma ray count log 802 (labeled SGRC in the first column); shallow, medium, and deep resistivity logs 804-808 (labeled SESP, SEMP, and SEDP in the third column); a density log 810 (labeled SBD2 in the fourth column); and a neutron porosity log 812 (labeled CTNL in the fourth column). FIG. 7 further shows a log of the measured salt concentration 814 (labeled SwS in the fifth column). The system's quantification of formation fluid salt concentration enables the determination of logs that enhance accuracy in determining the amount of original hydrocarbons in place, as well as remaining hydrocarbons during the development stage of a reservoir.

Numerous variations and modifications will become apparent to those skilled in the art once the above disclosure is fully appreciated. For example, the logging tools described herein can be implemented as logging while drilling tools and as wireline logging tools. It is intended that the following claims be interpreted to embrace all such variations and modifications.

What is claimed is:

1. A salt concentration logging tool comprising:
    a neutron source that emits neutrons into a formation around a borehole;
    a neutron detector that measures a neutron count rate;
    a gamma ray detector that measures a gamma ray count rate indicative of a neutron capture rate by hydrogen nuclei; and
    a processor that provides a salt concentration measurement based at least in part on said count rates.

2. The logging tool of claim 1, wherein the neutron detector and gamma ray detector are co-distant from the neutron source.

3. The logging tool of claim 1, wherein the neutron detector is a Helium-3 filled detector that is sensitive to at least thermal neutrons.

4. The logging tool of claim 1, further comprising a second neutron detector spaced farther from the source than the other neutron detector.

5. The logging tool of claim 4, wherein the processor further provides a neutron porosity based at least in part on count rates from said neutron detectors.

6. The logging tool of claim 1, wherein said salt concentration determined by the processor is also based in part on a measure of formation porosity.

7. The logging tool of claim 1, wherein the neutron source is a continuous neutron source.

8. A salt concentration logging method comprising:
    emitting neutrons from a neutron source;
    obtaining a neutron count rate at a first distance from said neutron source;
    obtaining a hydrogen-capture gamma ray count rate at said first distance from said neutron source;
    determining a salt concentration measurement based at least in part on a ratio of said count rates.

9. The method of claim 8, wherein said neutron detector is a Helium-3 filled detector that is sensitive to at least thermal neutrons.

10. The method of claim 8, further comprising obtaining a neutron count rate at a second, larger distance from the neutron source.

11. The method of claim 10, further comprising determining a formation porosity based at least in part on said neutron count rates.

12. The method of claim 8, wherein said salt concentration measurement is also based in part on a measure of formation porosity.

13. The method of claim 12, wherein said measure of formation porosity is an average of a neutron porosity and a density-based porosity.

14. The method of claim 8, wherein the neutron source is a continuous neutron source.

15. The method of claim 8, further comprising displaying a log of said ratio versus depth.

16. The method of claim 8, further comprising displaying a salt concentration log.

17. A salt concentration logging system comprising:
    a logging tool that measures at least a neutron capture rate by hydrogen nuclei and a neutron flux at a distance from a neutron source; and
    a processing system that processes the neutron capture rate and the neutron flux measurements to generate and display a salt concentration log.

18. The system of claim 17, wherein the logging tool also measures a second neutron flux at a second distance from the neutron source, and wherein the processing system processes said neutron fluxes to determine a formation porosity log.

19. The system of claim 18, wherein said salt concentration log is based at least in part on a ratio of the neutron capture rate to the neutron flux measurement.

20. The system of claim 19, wherein said salt concentration log is also based in part on formation porosity.

* * * * *